(No Model.)

A. A. HOUGHTON.
SCALE.

No. 280,377. Patented July 3, 1883.

Witnesses.
J. M. Caldwell.
T. P. Brann

Inventor.
A. A. Houghton
By James Sangster
Atty.

UNITED STATES PATENT OFFICE.

ALFRED A. HOUGHTON, OF BUFFALO, NEW YORK.

SCALE.

SPECIFICATION forming part of Letters Patent No. 280,377, dated July 3, 1883.

Application filed May 17, 1883. (No model.)

To all whom it may concern:

Be it known that I, ALFRED A. HOUGHTON, a citizen of the United States, residing in Buffalo, in the county of Erie and State of New York, have invented certain new and useful Improvements in Scales, of which the following is a specification.

This invention relates to certain improvements in scale-beams, whereby the scale may be instantly brought to a balance when the scoop is either off or on the scale, as will be fully and clearly hereinafter shown by reference to the accompanying drawings, in which—

Figure 1:
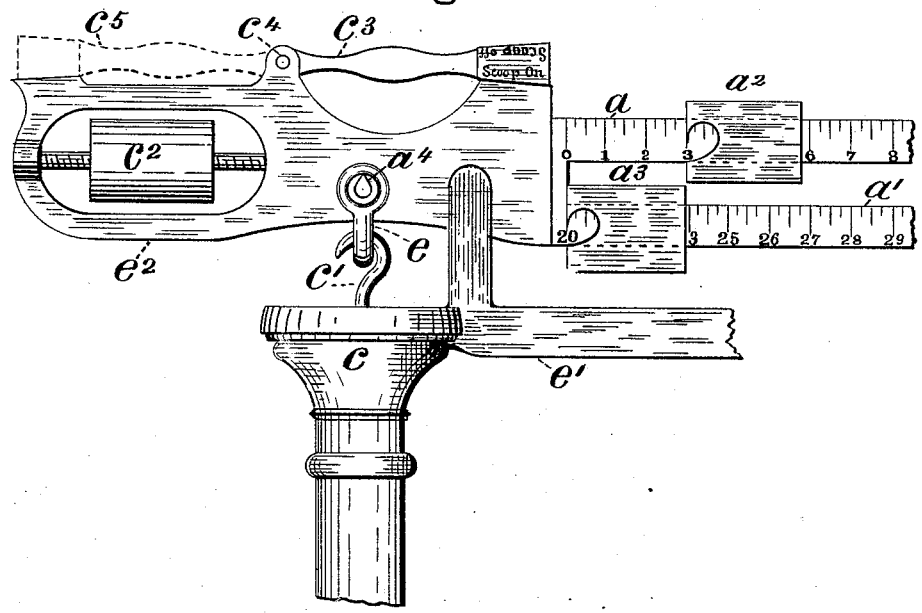
Figure 2:
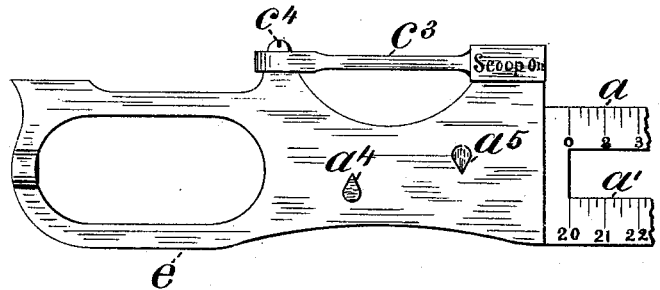

Figure 1 is a side elevation of a portion of a scale and scale-beam having my invention attached thereto; and Fig. 2 is a side elevation of a part of a scale-beam, showing a modification of my invention.

In Fig. 1 I have shown a double beam, $a$ $a'$, $a^2$ $a^3$ being the usual poises. $a^4$ $a^5$ represent the ordinary pivots. $c$ is a portion of a column or standard to which the beam is attached. $c'$ represents the steelyard-rod, which is connected in any well-known way, and $c^2$ is the balance-ball. The pivoted balancing weight or latch $c^3$ is pivoted to the upper part of the rear portion of the beam by a pin, $c^4$. It is pivoted at the proper point for balancing the beam either when the scoop is on or off, and is provided with the words "Scoop on" and "Scoop off" arranged in reverse order, so that when turned forward in the position shown in Fig. 1 the words "Scoop on" will be right side up, and when turned over to the other position to balance the beam when the scoop is off the words "Scoop off" will be right side up. When the latch $c^3$ is secured to the beam by a vertical pin, so as to swing horizontally around from one position to the other, as shown in Fig. 2, the words "Scoop on" and "Scoop off" should be put on opposite sides of the latch or pivoted weight. In this way only one side is shown at once, and either can be seen and read separately.

In the drawings I have shown a suitable scale-beam; but any other kind of a scale-beam may be used. The latch $c^3$ may also be made to act as a weight, and balance a load, for instance, of ten pounds, more or less, and it may also be connected to and made to operate at the front end of the beam.

I claim as my invention—

1. A pivoted weight or latch, in combination with a scale-beam for balancing the beam when the scoop is either on or off, as specified, or to act as a weight, as described.

2. The combination, with a scale-beam, of a pivoted weight or latch, $c^3$, provided with the words "Scoop on" and "Scoop off," for balancing the beam and indicating when the scoop is on or off, substantially as described.

ALFRED A. HOUGHTON.

Witnesses:
J. M. CALDWELL,
JAMES SANGSTER.